United States Patent
Metzger et al.

(10) Patent No.: US 12,463,395 B2
(45) Date of Patent: Nov. 4, 2025

(54) LASER SYSTEM AND METHOD FOR THE SPECTRAL BROADENING OF PULSED LASER RADIATION

(71) Applicant: TRUMPF Scientific Lasers GmbH + Co. KG, Unterfoehring (DE)

(72) Inventors: Thomas Metzger, Munich (DE); Sebastian Stark, Munich (DE)

(73) Assignee: TRUMPF SCIENTIFIC LASERS GMBH + CO. KG, Unterfoehring (DE)

( * ) Notice: Subject to any disclaimer, the term of this patent is extended or adjusted under 35 U.S.C. 154(b) by 670 days.

(21) Appl. No.: 17/891,157

(22) Filed: Aug. 19, 2022

(65) Prior Publication Data
US 2022/0416493 A1 Dec. 29, 2022

Related U.S. Application Data

(63) Continuation of application No. PCT/EP2021/054860, filed on Feb. 26, 2021.

(30) Foreign Application Priority Data

Feb. 26, 2020 (DE) ..................... 10 2020 105 015.1

(51) Int. Cl.
*H01S 3/00* (2006.01)
*G02F 1/35* (2006.01)
(Continued)

(52) U.S. Cl.
CPC .......... *H01S 3/0057* (2013.01); *G02F 1/3503* (2021.01); *H01S 3/005* (2013.01);
(Continued)

(58) Field of Classification Search
CPC ...... G02F 1/3503; G02F 1/3511; H01S 3/005; H01S 3/0057; H01S 3/0071; H01S 3/036;
(Continued)

(56) References Cited

U.S. PATENT DOCUMENTS 11,846,866 B2 * 12/2023 Bauer .................. G02F 1/3511
2012/0170112 A1 7/2012 Sandstrom
(Continued)

FOREIGN PATENT DOCUMENTS

CN 2890991 Y 4/2007
DE 102014007159 A1 11/2015

OTHER PUBLICATIONS

N. Smijesh et al, "Contrast improvement of sub-4 fs laser pulses using nonlinear elliptical polarization rotation," Optics Letters, Aug. 2019, 4028-4031, vol. 44, Issue 16, Optica Publishing Group, Washington, DC, USA.
(Continued)

*Primary Examiner* — Daniel Petkovsek
(74) *Attorney, Agent, or Firm* — Leydig, Voit & Mayer, Ltd.

(57) ABSTRACT

A laser system includes a laser radiation source for providing pulsed laser radiation, and an optical system that includes a first polarization setting optical unit configured to set a circular polarization state of the pulsed laser radiation and a multipass cell having at least two mirrors. The pulsed laser radiation passes through the multipass cell with formation of a plurality of intermediate focus zones. The multipass cell is filled with a filling gas that has an optical nonlinearity and causes a spectral broadening of the pulsed laser radiation in the intermediate focus zones. A pressure of the filling gas is set in a pressure range so that there is an ionization behavior of the filling gas in a form of multiphoton ionization. Focus diameters of the intermediate focus zones are set such that the pulsed laser radiation passes through the multipass cell without ionization of the filling gas.

16 Claims, 2 Drawing Sheets

(51) Int. Cl.
*H01S 3/036* (2006.01)
*H01S 3/08* (2023.01)
*H01S 3/094* (2006.01)
*H01S 3/10* (2006.01)
*H01S 3/22* (2006.01)

(52) U.S. Cl.
CPC .......... *H01S 3/036* (2013.01); *H01S 3/08095* (2013.01); *H01S 3/094076* (2013.01); *H01S 3/10038* (2013.01); *H01S 3/10061* (2013.01); *H01S 3/2207* (2013.01); *G02F 1/3511* (2013.01)

(58) Field of Classification Search
CPC .......... H01S 3/08095; H01S 3/094076; H01S 3/10038; H01S 3/10061; H01S 3/2207
See application file for complete search history.

(56) References Cited

U.S. PATENT DOCUMENTS

2017/0125964 A1    5/2017  Russbueldt et al.
2022/0399695 A1*  12/2022  Metzger ............ H01S 3/094076

OTHER PUBLICATIONS

Kaumanns, et al., "Multipass Spectral Broadening of 18 mJ Pulses Compressible from 13 ps to 41 fs," *Optics Letters* 43, 23, pp. 5877-5880, Nov. 30, 2018, Optica Publishing Group, Washington D.C., USA.

Chen, et al., "Generation of 4.3 fs. 1 mJ Laser Pulses via Compression of Circularly Polarized Pulses in a Gas-Filled Hollow-Core Fiber," *Optics Letters* 34, 10, pp. 1588-1590, May 15, 2009, Optica Publishing Group, Washington D.C., USA.

Marc, et al., "Nonlinear Temporal Compression in Multipass Cells: Theory," *Journal of the Optical Society of America—B*, 34, 7, pp. 1340-1347, Jun. 5, 2017, Optica Publishing Group, Washington D.C., USA.

Homoelle D et al, "Pulse contrast enhancement of high-energy pulses by use of a gas-filled hollow waveguide," Optics Letters, Sep. 15, 2002, pp. 1646-1648, vol. 27, Issue 18, Optica Publishing Group, Washington, DC, USA.

* cited by examiner

LASER SYSTEM AND METHOD FOR THE SPECTRAL BROADENING OF PULSED LASER RADIATION

CROSS REFERENCE TO RELATED APPLICATIONS

This application is a continuation of International Application No. PCT/EP2021/054860 (WO 2021/170814 A1), filed on Feb. 26, 2021, and claims benefit to German Patent Application No. DE 10 2020 105 015.1, filed on Feb. 26, 2020. The aforementioned applications are hereby incorporated by reference herein.

FIELD

Embodiments of the present invention relate to laser systems with an optical system for the spectral broadening of pulsed laser radiation and to laser systems, in particular ultrashort pulse (USP) laser systems, for emitting pulsed laser radiation with a high pulse energy. Furthermore, embodiments of the present invention relate to a method for the spectral broadening of pulsed laser radiation, in particular of ultrashort pulse trains.

BACKGROUND

DE 10 2014 007159 A1 discloses a method for the spectral broadening of laser pulses for nonlinear pulse compression using an arrangement having a sequence of nonlinearly interacting sections such as may be provided in a multipass cell constructed in the form of a so-called Herriott cell, for example. In that case, the aim is a spectral broadening of laser pulses which can be carried out even in the case of a pulse power which is greater than the critical power of the nonlinear medium used for the spectral broadening.

SUMMARY

Embodiments of the present invention provide a laser system that includes a laser radiation source for providing pulsed laser radiation. The pulsed laser radiation includes laser pulses having pulse energies in a range of 1 mJ to 100 J and pulse durations in a range of 10 fs to 5 ps. The laser system further includes an optical system for spectral broadening of the pulsed laser radiation. The optical system includes a first polarization setting optical unit configured to set a circular polarization state of the pulsed laser radiation, and a multipass cell having at least two mirrors. The pulsed laser radiation passes through the multipass cell with formation of a plurality of intermediate focus zones. The multipass cell is filled with a filling gas that has an optical nonlinearity and causes a spectral broadening of the pulsed laser radiation in the intermediate focus zones. A pressure of the filling gas is set in a pressure range so that there is an ionization behavior of the filling gas in a form of multiphoton ionization. Focus diameters of the intermediate focus zones are set such that the pulsed laser radiation passes through the multipass cell without ionization of the filling gas.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
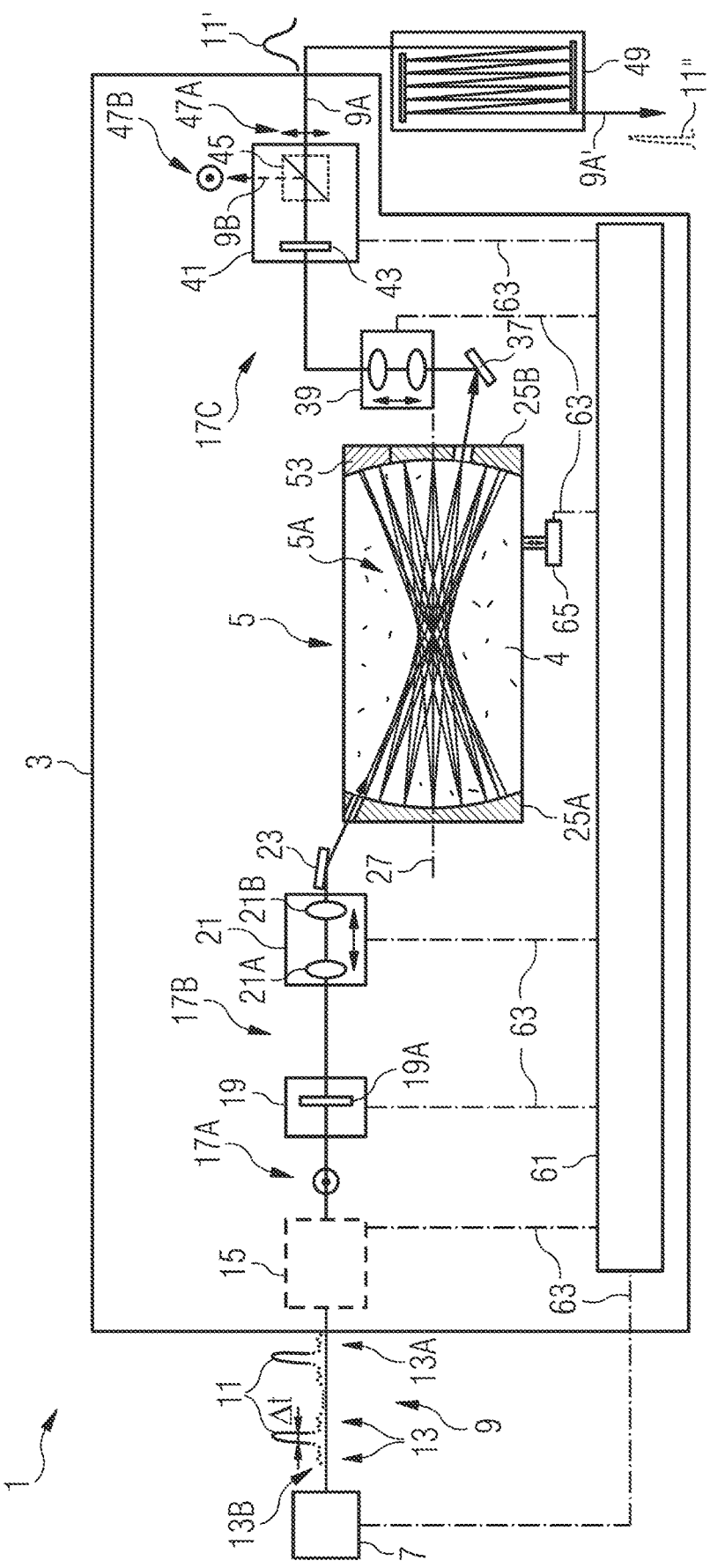
FIG. 1 shows an exemplary schematic illustration of a laser system comprising an optical system for spectral broadening according to embodiments.

Embodiments of the present invention provide systems and methods which can be used for the spectral broadening of pulsed laser radiation, for example of ultrashort pulse trains, in a compact set-up even and in particular in the case of high pulse energies and optionally high average powers. In particular, embodiments of the present intention utilize nonlinear effects in a filling gas for influencing the spectral broadening of laser pulses with high pulse energies in an arrangement with the smallest possible spatial size.

In a first aspect, a laser system comprises a laser radiation source for providing pulsed laser radiation. The pulsed laser radiation comprises laser pulses having pulse energies in the range of 1 mJ to 100 J, preferably 10 mJ to 1 J and pulse durations in the range of 10 fs to 5 ps, preferably 500 fs to 1.5 ps. Furthermore, the laser system comprises an (at least one) optical system for the spectral broadening of the pulsed laser radiation comprising a first polarization setting optical unit, which sets a circular polarization state of the pulsed laser radiation, and a multipass cell having at least two mirrors. The pulsed laser radiation—which is present in the circular polarization state—passes through the multipass cell with formation of a plurality of intermediate focus zones. The multipass cell is filled with a filling gas having an optical nonlinearity, wherein the filling gas causes a spectral broadening of the pulsed laser radiation in the intermediate focus zones. In the multipass cell, a pressure of the filling gas is set in a pressure range in which there is an ionization behavior of the filling gas in the context of multiphoton ionization. Furthermore, focus diameters of the intermediate focus zones are set in such a way that the pulsed laser radiation passes through the multipass cell without ionization of the filling gas (in the intermediate focus zones).

A further aspect comprises a method for the spectral broadening of pulsed laser radiation using a nonlinearity of a filling gas of a multipass cell having at least two mirrors. The multipass cell forms a plurality of intermediate focus zones. The method comprises the following steps:

generating pulsed laser radiation comprising laser pulses having pulse energy in a range of 1 mJ to 100 J, in particular in a range of 10 mJ to 1 J, and pulse durations in a range of 10 fs to 5 ps, in particular in a range of 500 fs to 1.5 ps, setting a circular polarization state of the pulsed laser radiation for passing through the multipass cell, input coupling the pulsed laser radiation into the multipass cell, wherein the pulsed laser radiation passes through the plurality of intermediate focus zones and interacts nonlinearly with the filling gas in the intermediate focus zones, thereby causing a spectral broadening of the pulsed laser radiation in the intermediate focus zones, setting the pressure of the filling gas in a pressure range in which there is an ionization behavior of the filling gas in the context of multiphoton ionization, setting focus diameters in the intermediate focus zones in such a way that the pulsed laser radiation passes through the multipass cell without ionization of the filling gas, and output coupling the spectrally broadened pulsed laser radiation out of the multipass cell.

If the pressure is set for an ionization behavior of the filling gas in the context of multiphoton ionization, a pure multiphoton ionization is present, in particular, in which avalanche ionization substantially does not contribute to the ionization of the gas. In this case, setting the focus geometry so that the intermediate focus zone is traversed without ionization means that an ionization that possibly occurs takes place only to an extent that does not disturb the implementability of a desired spectral broadening.

As a condition for setting the parameters of the multipass cell for an ionization behavior in the context of multiphoton ionization, the pressure is set in a range in which a peak intensity of a laser pulse at which an ionization of the filling gas commences (also referred to herein as multiphoton-ionizing (threshold) intensity) is substantially independent of the pressure of the filling gas or decreases insignificantly as the pressure of the filling gas rises. (Insignificantly relates here to the extent of a pressure increase of an order of magnitude such as is required for a sought increase in the nonlinearity.)

In some embodiments, the multipass cell is filled with He gas as filling gas with a pressure in a range of 100 Pa to 60 000 Pa, in particular in a range of 1000 Pa to 50 000 Pa. In other embodiments, the multipass cell is filled with Ar gas as filling gas with a pressure in a range of 100 Pa to 50 000 Pa, in particular in a range of 1000 Pa to 40 000 Pa.

In some embodiments, the focus diameters of the intermediate focus zones are set in such a way that a peak intensity that arises in conjunction with the pulse duration and the pulse energy of the laser pulses in the intermediate focus zones lies in the range of 50% to 110% of a multiphoton-ionizing (threshold) intensity.

In some embodiments, the first polarization setting optical unit can comprise a first waveplate, for example a $\lambda/4$ waveplate and/or a $\lambda/2$ waveplate.

In some embodiments, the optical system can furthermore comprise at least one of the following optical components:
a pulse duration setting system for setting a pulse duration of the laser pulses of the pulsed laser radiation,
a first optical telescope arrangement, which is set to image the pulsed laser radiation onto a predefined mode in the multipass cell and which is optionally arranged downstream of the first polarization setting optical unit,
an input coupling mirror for coupling the pulsed laser radiation into the multipass cell,
an output coupling mirror for forwarding the pulsed laser radiation emerging from the multipass cell, and
a second optical telescope arrangement, which is set to collimate the pulsed laser radiation emerging from the multipass cell.

In some embodiments, the multipass cell can be embodied with a predetermined or settable number of intermediate focus zones, and/or with intermediate focus zones having substantially an identical diameter and an identical Rayleigh length, and/or with intermediate focus zones arranged one on top of another, next to one another and optionally so as to be partly superposed on one another, in a resonator set-up with, in particular identical, radii of curvature of the at least two mirrors, optionally in a confocal or concentric arrangement, and/or in a resonator-like set-up with, in particular identical, radii of curvature of the at least two mirrors, optionally in an almost confocal or an almost concentric arrangement, and/or in an arrangement in which the at least two mirrors comprise a plurality of mirror segments, wherein an intermediate focus zone is formed between each two mirror segments, and the intermediate focus zones are traversed successively, as a cell filled with a noble gas such as helium or argon as filling gas, wherein the same pressure is present in each of the intermediate focus zones, and/or for stepwise nonlinear spectral broadening of the pulsed laser radiation passing through in the intermediate focus zones.

In some embodiments, the laser system can furthermore comprise a second polarization setting optical unit for returning the circular polarization state to a linear polarization state. The second polarization setting optical unit can be arranged downstream of the multipass cell and comprise in particular a second, in particular achromatic, waveplate, for example a $\lambda/4$ waveplate and/or a $\lambda/2$ waveplate.

In some embodiments, the laser system can furthermore comprise at least one of the following optical components:
a pulse duration setting system for setting the pulse duration of the laser pulses,
an optical pulse duration compressor system for compensating for a dispersive contribution of the optical system and/or for temporally compressing the laser pulses of the laser radiation that have experienced the nonlinear spectral broadening in at least one of the intermediate focus zones,
a beam splitter for separating different polarization states output by the multipass cell, and
a control system configured for compensating for a reduction of the nonlinearity of the filling gas on account of the set circular polarization for setting a pressure of the filling gas in the multipass cell.

In some embodiments, the method can furthermore comprise at least one of the following steps:
providing He gas as filling gas and setting the pressure in a range of 100 Pa to 60 000 Pa, in particular in a range of 1000 Pa to 50 000 Pa,
providing Ar gas as filling gas and setting the pressure in a range of 100 Pa to 50 000 Pa, in particular in a range of 1000 Pa to 40 000 Pa, and
increasing the pressure of the filling gas for the purpose of increasing the nonlinearity in such a way as to compensate for a decrease in a nonlinearity of the filling gas in the case of circular polarization proceeding from a nonlinearity of the filling gas which is present in the case of an identical pressure and in the case of linear polarization.

In some embodiments, the method can furthermore comprise the following step:
setting the focus diameters of the intermediate focus zones in such a way that a peak intensity that arises in conjunction with the pulse duration and the pulse energy of the laser pulses in the intermediate focus zones lies in the range of 50% to 110% of a multiphoton-ionizing (threshold) intensity.

In some embodiments, the method can furthermore comprise at least one of the following steps:
setting the polarization of the spectrally broadened pulsed laser radiation for a subsequent beam path, and
carrying out a dispersion compensation of the spectrally broadened pulsed laser radiation.

In some embodiments of the method, furthermore, at least one of the following parameters of the multipass cell can be set:
a dispersion of the laser pulses that has accumulated in the multipass cell,
focus diameters in the intermediate focus zones, and
Rayleigh lengths of the intermediate focus zones.

According to embodiments of the present invention, a gas-filled multipass cell is used for the spectral broadening of pulsed laser radiation with circular polarization. This has the advantage that the gas-filled multipass cell can be constructed with a reduced length. This is because by reducing the maximum electric field strength on account of the incidence of circularly polarized laser radiation (that is to say that more pulse energy is required for reaching the ionization threshold), it is possible to embody the multipass cell with a smaller diameter in the intermediate focus zones. This brings about smaller radii of curvature of the mirrors constituting the multipass cell, and thus results in a shortening of the, for example, confocally or concentrically constructed, multipass cell (in comparison with a multipass cell operated with linear polarization). Preferably, the multipass cell is operated with parameters in the range of multiphoton ionization; i.e. outside the range of (electron) avalanche ionization, in which very many free electrons arise during the ionization process. Multiphoton ionization is the prevailing ionization process in "sparse" gases such as are present at the pressures specified herein for noble gases.

Operating the multipass cell with parameters (inter alia density, pulse length, pulse energy) which characterize the ionization process of multiphoton ionization allows the nonlinearity in the filling gas to be increased by raising the pressure in the multipass cell, where raising the pressure substantially does not influence the circular breakdown pulse energy required for ionization (with no change in pulse duration and focus size and also circular polarization). For helium as filling gas, multiphoton ionization takes place in the range of $10^{13}$-$10^{15}$ watts/cm$^2$ with a pressure of 1000 Pa to a few hundred mbar (n*$10^4$ Pa), e.g. 60 000 Pa.

In some embodiments, the mirrors of the multipass cell are embodied as convex mirrors, wherein the radii of curvature match, in particular, and/or a distance between the mirrors lies in a range of 95% to 105% of the sum of the radii of curvature. Alternatively or supplementarily, at least one of the mirrors can be embodied as a dispersive mirror, the dispersion contribution of which compensates for a dispersive contribution of at least one pass of a laser pulse of the pulsed laser radiation through the multipass cell. Alternatively or supplementarily, furthermore, at least one of the mirrors can comprise a plurality of mirror segments on which the pulsed laser radiation impinges at least once during the circulation of the pulsed laser radiation through the multipass cell.

In some embodiments, the multipass cell is embodied in such a way that a laser pulse of the pulsed laser radiation, the spectrum of which pulse is intended to be broadened in the optical system, experiences substantially no change in the pulse duration and/or pulse energy in the intermediate focus zones.

The spectral broadening can optionally be combined e.g. with a subsequent pulse duration compression in order to generate pulsed laser radiation with a short pulse duration and high peak intensities.

Concepts which allow aspects from the prior art to be improved at least in part are disclosed herein. In particular, further features and their expediencies will become apparent from the following description of embodiments with reference to the figures. In the figures:

Aspects described herein are based in part on the insight that a shortening of a multipass cell which is used for the spectral broadening of high-intensity laser radiation can be successfully implemented by reducing the maximum electric field strength on account of high-intensity laser radiation with circular polarization being transmitted. It has been recognized here that for the advantageous use of circular polarization the parameters of the laser radiation for the respective filling gas preferably lie in the range of multiphoton ionization, such that an increase in the pressure (and thus in the gas density in the multipass cell) does not affect, or only slightly affects, the electric field strength required for ionization.

It is known that in the case of circularly polarized laser radiation, the pulse energy required for the ionization of a filling gas is significantly increased, e.g. by a factor of 3 to 10. For circularly polarized laser radiation, moreover, the nonlinear portion of the refractive index of the filling gas that is present in the intermediate focus zones is smaller, and so a desired nonlinear effect occurs only at higher intensities/pulse energies. By way of example, the nonlinearity in the case of circular polarization is reduced to one third of the value of the nonlinearity that would be present in the case of linear polarization.

In order to compensate for the reduced nonlinearity, it is proposed to raise a gas pressure in the multipass cell by a compensation factor (for example by a factor of 3).

It has been recognized in this context that for He gas it is possible to operate a multipass cell at a pressure in the range around or below one bar (100 000 Pa) for e.g. ultrashort laser pulses in the multiphoton absorption range, in which the pulse energy required for ionization is almost independent of pressure. Accordingly, the pressure in the multipass cell can be increased without any significant effect on the ionization behavior and the nonlinearity that is reduced on account of the circular polarization can thus be compensated for.

In other words, for a gas-filled multipass cell there is the possibility of setting a configuration of the optical beam path (substantially in regard to the spectral broadening given by parameters of the intermediate focus zones) and parameters of the filling gas (substantially given by a gas pressure in the multiphoton absorption range depending on the gas species) in such a way that with the use of circular polarization a spectral broadening sought is achieved in a multipass cell construction that is as short and compact as possible.

Estimating that the length of a multipass cell scales proportionally to the square root of the ratio of pulse energy required for ionization in the case of linear polarization to pulse energy required for ionization in the case of circular polarization, the multipass cell can be significantly shortened in this way. This results in approximately a possible shortening by a factor of $\sqrt{3}$. In other words, the length of e.g. a Herriott cell can be shortened by setting a circular polarization for the laser radiation that is to be spectrally broadened, wherein the boundary condition of operating the Herriott cell for the nonlinear interaction as "close as possible to the ionization threshold" can be complied with at the same time.

A multipass cell can be constructed with a mirror pair, such as for example with the Herriott cell explained below in association with the figures. Generally, a multipass cell provides a multiple pass through intermediate focus zones. Intermediate focus zones can be formed between optical elements, e.g. between reflections on mirrors/mirror segments. In this respect, see also DE 10 2014 007159 A1 cited in the introduction. A plurality of intermediate focus zones can for example also be embodied in modular set-ups of Herriott-like cells with a plurality of mirror segments. The beam path can be folded one or more times in the multipass cell.

FIG. 1 shows a laser system 1 comprising an optical system 3 for spectral broadening. The optical system 3 is based on the use of a multipass cell 5 filled with filling gas 4 (for example a Herriott cell), the filling gas 4 serving as a nonlinear (Kerr) medium. By way of example, noble gases are used as filling gases. At very high intensities, it is possible to use helium with a high ionization threshold (ionization threshold approximately 3 times higher than argon). In the case of lower but still high intensities in the multipass cell 5, for example argon or some other noble gas can be used as a nonlinear medium.

The laser system 1 generally comprises a laser radiation source 7, which outputs laser radiation 9. The laser radiation 9 comprises (primary) laser pulses 11 having a pulse energy in the range of a few mJ, for example at least 20 mJ, e.g. a few hundred millijoules, and a pulse duration $\Delta t$ in the range of a few hundred femtoseconds (FWHM pulse duration) or less, e.g. 500 fs. The laser pulses 11 form an ultrashort pulse train, for example.

Depending on the laser radiation source 7, the laser radiation 9 can furthermore comprise low-energy laser radiation 13, indicated by way of example as (secondary) prepulses 13A or postpulses 13B in FIG. 1.

Furthermore, the laser radiation source 7 can optionally have a pulse duration setting system 15 for setting the pulse duration of the laser pulses 11, wherein the pulse duration setting system 15 can also be assigned to the optical system 3, as indicated in FIG. 1.

It is assumed in the present example that at the output of the pulse duration setting system 15 or at the output of the laser radiation source 7, there is present the laser radiation 9 having a linear polarization 17A, the polarization vector of which is indicated as orthogonal to the plane of the drawing by way of example in FIG. 1. That is to say that both the laser pulses 11 and low-energy laser radiation 13 possibly present are linearly polarized.

The optical system 3 has a first polarization setting optical unit 19. In the latter, the laser radiation 9 is circularly polarized. The circular polarization can generally be set by means of a waveplate in the beam path upstream of the multipass cell 5/Herriott cell (for example by means of a zero- or few-order waveplate). For setting the circular polarization state of the laser radiation 9, the first polarization setting optical unit 19 in FIG. 1 comprises by way of example a first $\lambda/4$ waveplate 19A. FIG. 1 indicates at the output of the first polarization setting optical unit 19 a circularly circulating electric field vector in order to clarify a circular polarization state 17B.

Alternatively, the circular polarization can be set by way of Faraday rotators, Pockels cells or other suitable polarization-influencing elements. The setting of the polarization in the first polarization setting optical unit 19 can preferably be effected independently of the intensity if the waveplates operate with an anisotropic refractive index, for example with a birefringent crystal.

For the purpose of setting the circular polarization state of the laser radiation 9, for example, the first $\lambda/4$ waveplate 19A is set in relation to the polarization plane of the laser radiation 9 with an angle between a fast axis of the $\lambda/4$ waveplate and the polarization plane in such a way that the angle is approximately 45°. The angle lies in the range of 42°-48°, for example, with the result that an (e.g. also alignment-dictated residual) ellipticity of the polarization may possibly be present.

FIG. 1 furthermore shows a telescope arrangement 21 for matching the mode (generally beam parameters such as beam diameter and beam divergence) of the pulsed laser radiation 9 prior to input coupling into the multipass cell 5 by means of an input coupling mirror 23.

The multipass cell 5 comprises two concavely curved mirrors 25A, 25B, which form a beam path 5A running back and forth repeatedly between the mirrors 25A, 25B in a gas-filled environment. Between the mirrors 25A, 25B, in each pass the pulsed laser radiation passes through a focus zone region in which intermediate focus zones form with a corresponding high intensity of the pulsed laser radiation. An interaction of the laser radiation with a filling gas introduced into the multipass cell takes place in the intermediate focus zones, and leads to nonlinear effects, for example to the intended spectral broadening or—in the case of excessively high intensities that are to be avoided as far as possible in the intermediate focus zones—to an optical breakdown/excessively strong ionization of the filling gas. The operation of the multipass cell thus takes place on the basis of a trade-off between sufficient occurrence of spectral broadening of the laser radiation and avoidance of ionization effects on the laser radiation.

A stepwise nonlinear spectral broadening is brought about by the high intensity present in each case in an intermediate focus zone and by the nonlinearity of the refractive index of the gaseous medium in the multipass cell 5.

A Herriott cell is one example of a multipass cell into which pulsed laser radiation can be coupled for a multiple pass. The Herriott cell is formed by two concave mirrors aligned with one another for example in a concentric or confocal resonator arrangement (or almost in a concentric or confocal resonator-like arrangement with an offset from the ideal concentric or confocal arrangement of up to a few millimeters), generally also in some other resonator configuration, along a common optical axis 27 (given by the specific arrangement). In this case, the mirrors 25A, 25B are also referred to as Herriott or end mirrors. If the laser radiation 9 is introduced into the multipass cell 5 in a manner offset with respect to the optical axis 27, the laser radiation 9 will circulate repeatedly there and back on a predefined, usually elliptical (circular) pattern.

Figure 2A:
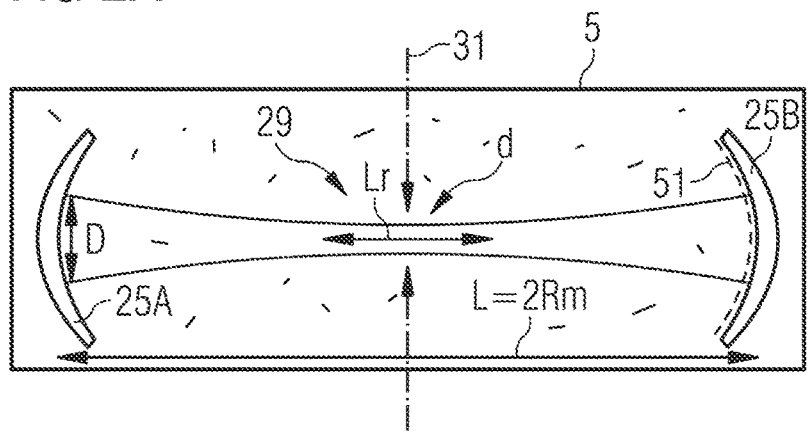
FIGS. 2A, 2B, and 2C show exemplary schematic diagrams for elucidating a Herriott cell as an example of a multipass cell according to embodiments.

FIG. 2A schematically illustrates the beam path between the mirrors 25A, 25B (two mirror segments) with the formation of an intermediate focus zone 29, presupposing a correspondingly matched mode of the input-coupled laser radiation 9. The intermediate focus zone 29 has for example a focus diameter d and a Rayleigh length Lr and lies in the region of a plane of symmetry 31 of the resonator arrangement, embodied in a concentric fashion in the example in FIG. 1.

Figure 2B:
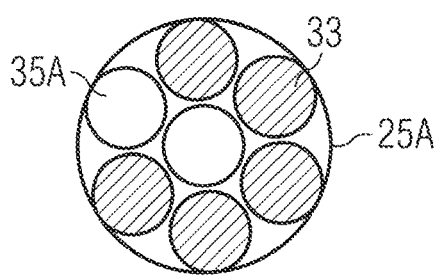
Figure 2C:
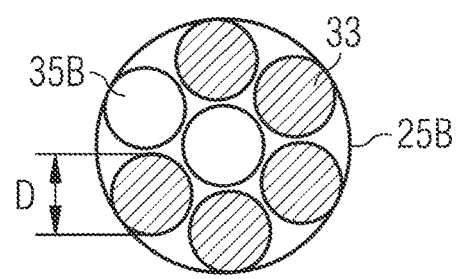

FIGS. 2B and 2C show plan views of the mirrors 25A, 25B, in which circularly arranged impingement regions 33 on the mirror surfaces are indicated schematically. The laser radiation 9 impinges as centrally as possible in the impingement regions 33 before it is reflected back from there again in the direction of the center of the multipass cell 5/the resonator arrangement. FIGS. 2B and 2C furthermore reveal an input coupling opening 35A and also an output coupling opening 35B. The regions available for the reflection on the surface of the mirrors 25A, 25B are circular area sections having a diameter D. The number of circulations (intermediate focus zones 29) can be of arbitrary magnitude, in principle; for example, 5 to 100 intermediate focus zones can be traversed; that is to say that a plurality of intermediate focus zones are traversed in the multipass cell. Furthermore, at least one of the mirrors 25A, 25B can also be constructed from individual discrete mirror elements, wherein a reflection can (impingement region 33) preferably take place on one individual mirror element. For example, twelve intermediate focus zones 29 are traversed.

As an alternative to the beam input coupling and beam output coupling through openings in the mirrors, smaller mirror elements engaging in the multipass cell can be used and positioned at the positions of the openings 35A, 35B, for example.

Referring to the beam path 5A indicated in FIG. 1, the pulsed laser radiation 9 is repeatedly guided through intermediate focus zones in the center of the multipass cell 5. High intensities form in the intermediate focus zones on account of the focusing of the laser pulses during the pulse duration $\Delta t$ of the laser pulses 11, and result in a nonlinear behavior of the refractive index of the gas 4. The nonlinear behavior of the refractive index of the gas 4 can be utilized for the spectral broadening of the pulsed laser radiation 9.

After the predetermined number of passes through the multipass cell 5, the laser radiation 9 leaves the multipass cell 5 and impinges on an output mirror 37, which reflects the output-coupled laser radiation. The output mirror 37 directs the laser radiation 9 through a second telescope arrangement 39, which recollimates the laser radiation 9.

A length of a multipass cell for nonlinear compression is given by a distance between the mirrors 25A, 25B. In a radial direction the extent of the multipass cell is dependent on the envisaged number of circulations.

The length of the multipass cell is of significance for the integration of a multipass cell into an optical set-up since it can be a few meters (e.g. up to 10 m or more). The length of a multipass cell is determined by two factors:
  a destruction threshold of the end mirrors. The destruction threshold dictates—for a predefined beam intensity—a minimum size of the reflected laser beam ("minimally settable beam diameter") on the end mirrors. With regard to a single pass, this minimum size together with the curvature of the end mirror determines the focus diameter in the intermediate focus zone. (Together with a number of reflection zones required, the minimum size of the reflected laser beam on the end mirrors furthermore defines a diameter of the end mirror.)
  An ionization threshold of the filling gas present in the multipass cell. The ionization threshold limits the intensity introducible in the intermediate focus zone, i.e. the intensity that can be utilized for the nonlinear interaction. The ionization threshold thus determines a "maximum beam intensity able to be input coupled" for predefined parameters of the intermediate focus zone. If ionization occurs to an increased extent in the intermediate focus zone, the laser radiation passing through the multipass cell may be disturbed and assume for example an intensity distribution deviating from the Gaussian beam profile, or a reduced transmission.

These two boundary conditions—what beam diameter is allowed on the end mirrors and what focus diameter and thus what intensity ought to be present in the center of the multipass cell—yield the length of the multipass cell.

If the pulse energy required for ionization is successfully raised, for example through the use of circular polarization as proposed herein, a shorter multipass cell can be constructed and used for the spectral broadening. A shorter multipass cell corresponds to shorter focal lengths (i.e. to a smaller radius of curvature of the end mirrors of a Herriott cell, for example), thus resulting in a smaller focus diameter in the intermediate focus zones, in which the intensity required for ionization is then not permitted to be reached or is not permitted to be significantly exceeded with the pulse energy and pulse duration present.

The nonlinearity that is reduced on account of the circular polarization and is experienced by the laser radiation upon passing through the multipass cell is compensated for by the pressure of the filling gas being raised.

With regard to the pulse energy to be used, it is chosen for a predefined pulse duration and focus geometry such that a (pulse) peak intensity that is in the range of or slightly below the incipient multiphoton ionization is present in the intermediate focus zone. The (pulse) peak intensity lies as an upper limit for example at a maximum of 10% above the intensity assigned to the ionization threshold; the intensity assigned to the ionization threshold in the range of multiphoton ionization is referred to herein as multiphoton-ionizing intensity. In view of fluctuations of the laser parameters, for example, the set (pulse) peak intensity can be reduced, for example to half of the multiphoton-ionizing intensity (lower limit of the pulse peak intensity). In other words, the geometry of the multipass cell is coordinated with a peak intensity of the laser pulses present (pulse energy/pulse duration/circular polarization) in such a way that in the case of the pulse duration and the pulse energy of the circularly polarized laser pulses in the intermediate focus zones a pulse peak intensity arises which lies in the range of 50% to 110% of a multiphoton-ionizing intensity—the multiphoton-ionizing intensity arises in the intermediate focus zones in the case of a (minimum) ionization pulse energy of circularly polarized laser pulses which leads to the ionization of the filling gas. In particular, the peak intensity can lie in a range of 50% to 100% or in a range of 60% to 105% or in a range of 60% to 95% or in a range of 70% to 90% of the multiphoton-ionizing intensity for circular polarization.

For adapting the polarization of the laser radiation 9 following the spectral broadening, the laser system 1 can comprise an arrangement of one or more waveplates (e.g. $\lambda/4$, $\lambda/8$, $\lambda/2$, $\lambda$ waveplates). The embodiment shown by way of example in FIG. 1 comprises a second (achromatic) $\lambda/4$ waveplate 43. The second $\lambda/4$ waveplate 43 converts the laser radiation emerging in the circular polarization state into a linear polarization again. Optionally, provision can additionally be made of waveplate(s) (e.g. a $\lambda/2$ waveplate) for aligning the polarization plane upstream or downstream of the second $\lambda/4$ waveplate 43.

Optionally, the optical system 3 can furthermore comprise an optical beam splitting system 41. In the embodiment shown by way of example in FIG. 1, the optical beam splitting system 41 comprises the second $\lambda/4$ waveplate 43 and a beam splitter 45 illustrated as a beam splitter cube. Further optical elements for separating different polarizations comprise thin-film polarizers and e.g. Wollaston prism arrangements. The beam splitter 45 can be utilized for beam purging vis-à-vis beam portions having other (non-circular) polarization states that are possibly generated in the multipass cell 5. These may arise given the possible presence for example of low-energy laser radiation 13 and an incompletely circular polarization in the multipass cell 5 if, on account of an intensity-dependent rotation of elliptical polarization states at the focus of the multipass cell 5, there is a difference between the alignments of the principal axes of the slightly elliptically polarized laser pulses 11 and the slightly elliptically polarized low-energy laser radiation 13 at the output of the multipass cell. Further set-ups for splitting beam portions having different elliptical polarization states are known from the prior art.

On account of the nonlinearity of the refractive index n of the gaseous Kerr medium in the multipass cell 5—i.e. for an intensity-dependent refractive index $n=n\_0+n\_2*I(r;t)$ with the gas-specific refractive index parameters $n\_0$ and $n\_2$ and the intensity profile $I(r;t)$ in the intermediate focus zone—a spectral broadening arises for the laser pulses 11.

FIG. 1 indicates by way of example a laser pulse 11' of the useful beam portion 9A, from which pre- and postpulses have been removed here by way of example.

For the subsequent use of the laser pulses 11' that have been spectrally broadened, the laser pulses 11' can be added to a compressor 49, for example. The compressor 49 is illustrated by way of example as a chirped mirror compressor in FIG. 1. A useful laser radiation 9A' comprising a train of compressed laser pulses 11" can thus be output at an output of the laser system 1.

In contrast to the set-up known from the prior art that uses an HCF, the configuration proposed herein using e.g. a Herriott cell can enable a predetermined/settable number of intermediate focus zones 29 to be traversed. Moreover, a focus diameter d in the intermediate focus zones is settable and can for example also be coordinated with the laser power, pulse duration, etc., and the gas 4 by way of the radius Rm of curvature of the mirrors 25A, 25B. The radius Rm of curvature is identical for both mirrors, for example, or is at least of the same order of magnitude.

Besides a settability of the size of the intermediate focus zone 29 e.g. by way of the radii of curvature of the mirrors 25A, 25B and also by way of a corresponding telescope arrangement for mode matching, which can be disposed upstream of the multipass cell, the gas pressure is set in regard to the nonlinearity. It is noted that given the presence of high spatial proximity of the various intermediate focus zones being traversed in the multipass cell, the same gas pressure is given in each of the intermediate focus zones. Preferably, the optical beam parameters and beam properties in the various intermediate focus zones are very similar, with the result that similar nonlinear effects are present as well.

If the mirrors 25A, 25B form a concentric resonator (distance between mirrors approximately 2*Rm given identical radii Rm of curvature), the intermediate focus zones 29 substantially all have the same diameter d and have correspondingly identical Rayleigh lengths Lr. Generally, the distance between the mirrors 25A, 25B lies in a range of 95% to 105% of the sum of the radii of curvature. An intensive laser pulse 11 propagates through these intermediate focus zones 29 sequentially and in the process interacts repeatedly with the gas 4 at electric field strengths which can bring about nonlinear effects on the refractive index n and thus on the spectrum of the laser pulse 11.

The use of the Herriott set-up described herein provides various parameters that are definable in advance and/or settable during operation for the design of the intermediate focus zones and the nonlinear conditions present therein. For setting the parameters, the optical system 3 can comprise a control system 61, for example, which is connected via control connections 63 to the pulse duration setting system 15, optionally the polarization setting optical unit 19 (in particular for setting the angular positions of the first λ/4 waveplate 19A and optionally a λ/2 waveplate), the telescope arrangements 21, 39 (in particular for setting the distance between telescope lenses 21A, 21B), a pressure setting device 65 for setting the gas pressure (see FIG. 1) and/or the subsequent waveplates (for example for setting the angular position of the second (achromatic) λ/4 waveplate 43) and optionally the optical beam splitting system 41.

The following can be set, for example, with the aid of the control system 3:

the pulse duration Δt and/or the dispersion and/or the spectral bandwidth of the laser pulses 11 of the pulsed laser radiation 9, the pulse energy of the laser pulses 11 of the pulsed laser radiation 9, a circular polarization of the pulsed laser radiation 9, the focus diameters d in the intermediate focus zones 29, the Rayleigh lengths Lr of the intermediate focus zones 29, and a gas pressure of the filling gas 4 in the intermediate focus zones 29.

As shown in FIG. 2B and FIG. 2C, the laser radiation 9 repeatedly impinges on the mirrors 25A, 25B (a number of times in each case). The mirrors can supplementarily be used for dispersion matching by virtue of their being embodied as dispersive mirrors. If the mirrors 25A, 25B have a dispersive effect at least in the case of one of the reflections, it is possible to directly affect the dispersion and thus the pulse duration of the laser pulses 11. By way of example, one or more of the impingement regions 33 can be provided with a dispersive layer. A dispersive coating 51 is indicated in a dashed manner for the mirror 25B by way of example in FIG. 2A. Moreover, each of the mirrors 25A, 25B can be constructed from a plurality of mirror segments having predetermined dispersive properties, the dispersion of each of the mirror segments being matched to a desired pulse duration in the pass through the multipass cell 5. Accordingly, the dispersion present in the multipass cell 5 is composed of a dispersion contribution of the dispersive mirrors and a dispersion contribution in the gas-filled volume along the beam path 5A.

One exemplary mirror segment 53 is indicated in FIG. 1. During the circulation of the pulsed laser radiation through the multipass cell, the laser radiation impinges (depending on the size of the mirror segment) at least once on the mirror segment, which usually has at least an extent of the magnitude of the beam diameter D on the mirror surface.

In other words, the concepts proposed herein allow a dispersion accumulated during passage through the gas-filled volume to be at least partly compensated for by suitable dispersive mirror coatings (chirped mirrors) in order for example to maintain comparable pulse durations in the intermediate focus zones or to vary the pulse durations in a targeted manner.

On account of the nonlinear spectral broadening, the pulse spectrum can change from intermediate focus zone to intermediate focus zone, specifically substantially with a constant pulse duration and constant pulse energy. If the multipass cell 5 is constructed by means of chirped mirrors, the pulse duration can additionally be set. By way of example, the pulse duration can change (shorten or lengthen) from pass to pass. Accordingly, the peak intensities in the intermediate focus zones remain substantially constant even in the case of a nonlinear spectral broadening.

A further advantage can arise in connection with the nonlinear spectral broadening if laser radiation having circular polarization is used for this purpose in the multipass cell. In this regard, the spectral broadening can possibly be effected inherently more smoothly across the frequency spectrum, such that a less structured spectrum can arise. This can have a positive effect on the subsequent pulse shaping and/or pulse compression.

FIG. 2A shows the formation of an intermediate focus zone in a Herriott cell, assuming curved Herriott mirrors. Geometric parameters for the implementation of a multipass cell in the context of the concepts presented herein are considered below.

The limiting of the pulse energies of laser pulses which can be spectrally broadened (and optionally be increased in terms of contrast) by means of a multipass cell results from an avoidance of laser-induced damage to the (Herriott) mirrors and from the ionization threshold value of the gas used. With the use of helium as gas 4 in the multipass cell 5, a highest possible ionization threshold value is approximately $3.42 \cdot 10^{14}$ W/cm².

The laser-induced damage to the mirrors 25A, 25B dictates a minimum diameter of the laser radiation 9 on the curved mirrors 25A, 25B. The ionization threshold value determines the smallest possible focus diameter d in the intermediate focus zones 29 with regard to avoiding an ionization of the gas 4. Both parameters together define a required length of the multipass cell 5, i.e. the distance between the mirrors from which the concentric resonator is constructed, for example, and also the radius of curvature thereof.

The nonlinear interaction with the filling gas is crucial for the spectral broadening, which interaction decreases in the case of circular polarization, as already discussed. The lower nonlinearity is compensated for by a pressure increase.

It is known that an increase in pressure can affect the ionization process. A distinction is drawn here between the range of multiphoton ionization (low pressure/low density, short pulses) and the range of avalanche ionization (higher pressure/higher density, long pulses). In the range of multiphoton ionization, for helium as filling gas, the energy required for ionization may substantially be regarded as independent of the gas pressure in the multipass cell. For other noble gases there is a dependence in the form of a slight decrease, the decrease becoming smaller if the gas pressure decreases. In the range of avalanche ionization, there is a greater decrease in the energy required for ionization as the gas pressure rises, since denser gas fosters the formation of the electron avalanche.

If the range of multiphoton ionization is employed, the change from linear polarization to circular polarization can lead to a considerable shortening of the multipass cell (e.g. a Herriott cell). In comparison with Ar gas, He gas has a lower nonlinearity, but a much higher ionization threshold. On account of the high ionization threshold, it is possible to use He gas as filling gas in a multipass cell for the spectral broadening of ultrashort pulses with pulse energies of greater than 20 mJ, the ionization threshold being in the range of multiphoton ionization e.g. in the case of 500 fs and pressures of less than 100 000 Pa.

The inventors have recognized that in the case of a multipass cell operated with pulse energies in the range of 20 mJ or more, for He gas a pressure increase has hardly any influence on the pulse energy required for ionization, and so it is possible to utilize He gas as filling gas together with circular polarization for shortening the Herriott cell.

In order to elucidate the shortening, it is assumed that linearly polarized ultrashort laser pulses with pulse energies of a few 10 mJ, for example 200 mJ, are coupled into an He-filled multipass cell. In order to provide a sufficiently nonlinear interaction at these high pulse energies in the multipass cell, it is necessary to set a pressure in the range of 10 000 Pa to 20 000 Pa, for example. A length of the multipass cell is then e.g. approximately 10 m.

By contrast, if a circular polarization is set for the ultrashort laser pulses with pulse energies of a few 10 mJ, for example 200 mJ, the energy required for ionization is increased, but the nonlinearity is also reduced. The multipass cell can then be operated comparatively close to the ionization threshold value, i.e. higher peak intensities can be set in the intermediate focus zones, by the length of the multipass cell being reduced to e.g. 5 m. With the insight that, in the case of He gas, the pressure at such pulse energies has almost no influence on the ionization threshold, it is possible, in order to provide a sufficiently nonlinear interaction, to raise the pressure from e.g. 20 000 Pa to 40 000 Pa. If the multipass cell is thus operated in the parameter range of multiphoton ionization, the positive effect of raising the ionization threshold on account of circular polarization can be (almost completely) exploited.

The concepts proposed herein for using He gas as filling gas and circular polarization in a multipass cell clearly present a possibility for reducing the length of the multipass cell in the case of a pulse energy of at least 20 mJ and pulse durations of 500 fs.

Analogously, for other filling gases such as Xe, Kr, Ar or Ne gas, there are corresponding parameter ranges in which circular polarization makes it possible to shorten the length of multipass cells operated in the range of multiphoton ionization. It should be taken into consideration here, however, that a small decrease in the pressure dependence may be present, depending on the operating point at which a multipass cell is operated in the range of multiphoton ionization.

If it is assumed for a multipass cell filled with Ar gas that the pulse energy required for ionization increases by a factor of 3 on account of circular polarization, then the length of the multipass cell becomes approximately 1.7 times ("$\sqrt{3}$") shorter. In order to compensate for the reduced nonlinearity as a result of circular polarization, the pressure of the e.g. Ar gas is increased e.g. from 15 000 Pa (in the unshortened set-up) to 45 000 Pa (in the shortened set-up).

It is noted that—if the pressure increase to be effected e.g. for Ar gas takes place outside the range of multiphoton ionization and in the range of an avalanche-like ionization process—the pulse energy required for ionization may decrease as the pressure increases. This counteracts the desired increase in the pulse energy required for ionization on account of circular polarization.

For the more compact set-up of multipass cells that is proposed herein, what is of importance is that the electric field strength required for an ionization is increased for circularly (possibly slightly elliptically modified circularly) polarized light in comparison with linearly polarized light, such that for a comparable beam diameter D on the mirrors 25A, 25B, the possible focus diameter d in the intermediate focus zones 29 can be chosen to be smaller. For circular polarization, this generally results in the possibility of reducing the distance between the mirrors (for example a distance between the mirrors 25A, 25B that is shortened by a factor of √3, i.e. approximately a factor of 2) in comparison with a multipass cell operated with linear polarization.

The shorter set-up leads to cost savings in the case of nonlinear compression by means of spectral broadening.

For the application of high-intensity laser radiation and in view of the destruction threshold of the mirrors, it may be necessary for the mirrors to withstand pulse energies of a few 100 mJ in conjunction with pulse durations of a few 100 fs, for example 500 fs or shorter. For ultrashort pulses, the mirrors should furthermore be of wideband design, e.g. designed for a wavelength range of e.g. 700 nm to 1100 nm, for example, for ultrashort pulses from a titanium-sapphire laser or 900 nm to 1100 nm for ultrashort pulses from lasers that emit around 1000 nm, such as Nd:YAG or Yb:YAG. Furthermore, the mirrors may or may not provide a dispersion contribution, and so dispersive coatings should possibly also be taken into account.

Exemplary parameters for a multipass cell and the mirrors on which it is based are explained below with reference to FIGS. 2A to 2C. For coated mirrors, it is possible to measure e.g. a laser-induced damage threshold value of approximately 0.5 J/cm2 in the case of a pulse duration of approximately 500 fs. This threshold value is usually assigned to the beam center. Assuming a Gaussian beam, e.g. a threshold value of approximately 0.1 J/cm2 thus results for the approximately 500 fs laser pulse, and so given a safety factor of 3, for example, the maximum permissible fluence would be approximately 0.03 J/cm2.

On the basis thereof, this results in e.g. a beam radius of approximately 9 mm for 200 mJ pulses or a converted 1/e2 beam diameter of approximately 13 mm on the mirrors 25A, 25B. This estimation may apply approximately equally to linear and also circular polarization.

For circularly polarized light (having a (maximum) electric field strength that is reduced in comparison with linearly polarized light), it is possible, as explained, to implement a reduced distance between the mirrors/a shortened multipass cell length/resonator length L with a correspondingly smaller radius of curvature of the mirrors 25A, 25B, assuming that the same beam diameter is present on the mirrors.

Figure 3:
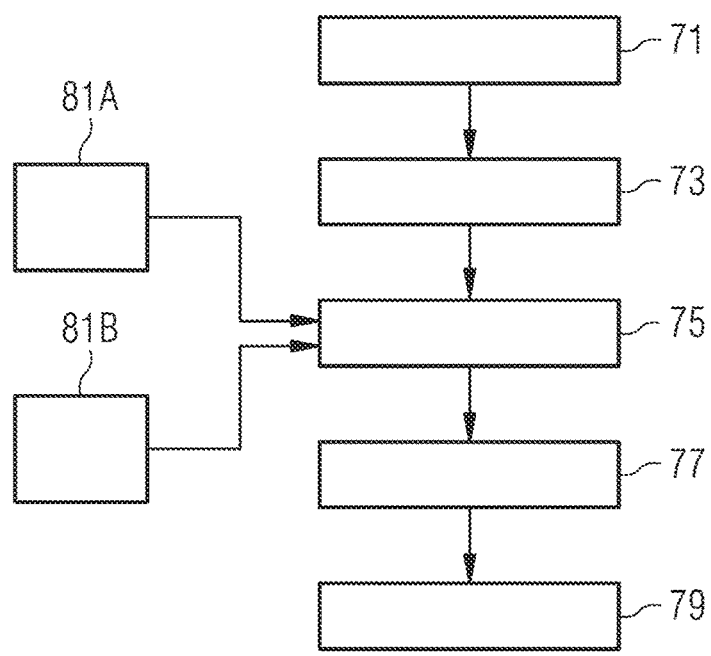
FIG. 3 shows a schematic flow diagram for elucidating an exemplary procedure for spectral broadening according to embodiments.

The steps in the procedure proposed herein for the spectral broadening of pulsed laser radiation using a multipass cell traversed with circular polarization will be explained with reference to the flow diagram shown in FIG. 3.

In step 71, pulsed laser radiation is generated which comprises laser pulses having a pulse energy in the range of 1 mJ to 100 J, preferably 10 mJ to 1 J and pulse durations in the range of 10 fs to 5 ps, preferably 500 fs to 1.5 ps.

Step 73 involves circularly polarizing the pulsed laser radiation for passing through the multipass cell—i.e. usually before entering the multipass cell.

In step 75, the spectral broadening of the pulsed laser radiation is effected. For this purpose, the pulsed laser radiation is input coupled into the multipass cell. The multipass cell is formed e.g. by at least 2 concave mirrors which define a multiple pass of intermediate focus zones; e.g. form a (in particular concentric or confocal) resonator or a resonator-like arrangement. In step 75, the multipass cell is traversed repeatedly with formation of a plurality of intermediate focus zones. The multipass cell is filled with a filling gas having an optical nonlinearity which causes the spectral broadening of the pulsed laser radiation in the intermediate focus zones.

Step 77 involves output coupling the spectrally broadened pulsed laser radiation out of the multipass cell.

In step 79, e.g. a linear polarization of the spectrally broadened pulsed laser radiation can be set and/or e.g. a compression of the spectrally broadened pulsed laser radiation can be effected.

In order furthermore to be able to utilize a compact set-up of the laser system (in particular the multipass cell having a short length) in conjunction with spectral broadening sought, in a step 81A, the pressure of the filling gas of the multipass cell is set in a pressure range in which an ionization of the filling gas using laser pulses whose pulse duration is comparable with the pulse duration of the laser pulses that are to be spectrally broadened would take place in the context of a multiphoton ionization process. That is to say that there is an ionization behavior of the filling gas in the context of multiphoton ionization. This allows the pressure of the filling gas, for the purpose of increasing the nonlinearity, to be set at a level high enough to compensate for a decrease in a nonlinearity of the filling gas in the case of circular polarization proceeding from a nonlinearity of the filling gas which is present in the case of an identical pressure and in the case of linear polarization.

For the spectral broadening sought, furthermore, a step 81B involves setting the focus diameter in the intermediate focus zones (e.g. by choosing the radii of curvature of the mirrors of the multipass cell and the beam diameters on the mirrors) in such a way that the pulsed laser radiation passes through the multipass cell without ionization of the filling gas. In this case, the focus diameter in the intermediate focus zones is chosen to be as small as possible, but with a safety margin with regard to optical damage to the mirrors and avoidance of (relatively strong) ionization of the filling gas.

Furthermore, it is possible for the laser radiation to pass through a sequence of successive multipass cells one after another. This allows gas conditions, mirror configurations and dispersion profiles to be set in a differentiated manner in regard to the groups of intermediate focus zones present in each of the individual multipass cells, in which case it is also possible to provide an "intermediate compression" between individual multipass cells.

It is explicitly emphasized that all features disclosed in the description and/or the claims should be regarded as separate and independent of one another for the purpose of the original disclosure and likewise for the purpose of restricting the claimed invention independently of the combinations of features in the embodiments and/or the claims. It is explicitly stated that all range indications or indications of groups of units disclose any possible intermediate value or subgroup of units for the purpose of the original disclosure and likewise for the purpose of restricting the claimed invention, in particular also as a limit of a range indication.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Laser system 1
Optical system 3
Gas 4
Multipass cell 5
Beam path 5A
Laser radiation source 7
Laser radiation 9, 9A, 9A', 9B
(Primary) laser pulses 11, 11', 11"
Low-energy laser radiation 13
Prepulse 13A
Postpulse 13B
Pulse duration setting system 15
Linear polarization 17A
Elliptical polarization state 17B, 17C
Polarization setting optical unit 19
First λ/4 waveplate 19A
λ/2 waveplate 19B
Telescope arrangement 21
Telescope lenses 21A, 21B
Input coupling mirror 23
(Herriott) mirrors 25A, 25B
Optical axis 27
Intermediate focus zone 29
Plane of symmetry 31
Impingement regions 33
Input coupling opening 35A
Output coupling opening 35B
Output mirror 37
Second telescope arrangement 39
Optical beam splitting system 41
Second λ/4 waveplate 43
Beam splitter 45
Linear polarization state 47A, 47B
Compressor 49
Dispersive coating 51
Mirror segment 53
Control system 61
Control connections 63
Pressure setting device 65
Pulse duration Δt
Focus diameter d
Rayleigh length Lr
Diameter D
Angle ΔΘ

The invention claimed is:

1. A laser system comprising:
a laser radiation source for providing pulsed laser radiation, wherein the pulsed laser radiation comprises laser pulses having pulse energies in a range of 1 mJ to 100 J and pulse durations in a range of 10 fs to 5 ps, and
an optical system for spectral broadening of the pulsed laser radiation, the optical system comprising:
a first polarization setting optical unit, configured to change a linear polarization state into a circular polarization state of the pulsed laser radiation,
a multipass cell having at least two mirrors, wherein the pulsed laser radiation passes through the multipass cell with formation of a plurality of intermediate focus zones, wherein the multipass cell is filled with a filling gas that has an optical nonlinearity and causes a spectral broadening of the pulsed laser radiation in the intermediate focus zones, and
a second polarization setting optical unit for returning the circular polarization state to the linear polarization state, wherein the second polarization setting optical unit is disposed downstream of the multipass cell,
wherein a pressure of the filling gas is set in a pressure range so that there is an ionization behavior of the filling gas in a form of multiphoton ionization, and focus diameters of the intermediate focus zones are set such that a peak intensity of the pulsed laser radiation passing through the multipass cell is below an ionization threshold value of the filling gas, wherein the ionization threshold value of the filling gas is increased for circular polarized radiation as compared to linear polarized radiation.

2. The laser system as claimed in claim 1, wherein the filling gas comprises He gas, and the pressure of the filling gas is in a range of 100 Pa to 60 000 Pa.

3. The laser system as claimed in claim 1, wherein the filling gas comprises Ar gas, and the pressure of the filling gas is in a range of 100 Pa to 50 000 Pa.

4. The laser system as claimed in claim 1, wherein the focus diameters of the intermediate focus zones are set such that the peak intensity that arises in conjunction with the pulse durations and the pulse energies of the laser pulses in the intermediate focus zones lies in a range of 60% to 95% of the ionization threshold value.

5. The laser system as claimed in claim 1, wherein the first polarization setting optical unit comprises a first waveplate.

6. The laser system as claimed in claim 5, wherein the first waveplate comprises a λ/4 waveplate and/or a λ/2 waveplate.

7. The laser system as claimed in claim 1, wherein the optical system further comprises at least one of the following optical components:
a pulse duration setting system for setting a pulse duration of the laser pulses of the pulsed laser radiation,
a first optical telescope arrangement configured to image the pulsed laser radiation onto a predefined mode in the multipass cell, the first optical telescope arrangement being disposed downstream of the first polarization setting optical unit,
an input coupling mirror for coupling the pulsed laser radiation into the multipass cell,
an output coupling mirror for forwarding the pulsed laser radiation emerging from the multipass cell, or
a second optical telescope arrangement configured to collimate the pulsed laser radiation emerging from the multipass cell.

8. The laser system as claimed in claim 1, wherein the multipass cell is configured to:
form a predetermined or settable number of intermediate focus zones, and/or
form the intermediate focus zones having substantially an identical diameter and an identical Rayleigh length, and/or
form the intermediate focus zones arranged one on top of another, or next to one another, or partly superposed on one another, and/or be in a resonator set-up with substantially identical radii of curvature of the at least two mirrors, in a confocal or concentric arrangement, or in a near confocal or near concentric arrangement, and/or be in an arrangement, wherein the at least two mirrors comprise a plurality of mirror segments, and wherein an intermediate focus zone is formed between each two mirror segments, and the intermediate focus zones are traversed successively, and/or be filled with a noble gas, wherein a same pressure is present in each of the intermediate focus zones, and/or cause stepwise nonlinear spectral broadening of the pulsed laser radiation passing through in the intermediate focus zones.

9. The laser system as claimed in claim 1, wherein the second polarization setting optical unit comprises a second waveplate.

10. The laser system as claimed in claim 9, wherein the second waveplate is achromatic and comprises a $\lambda/4$ waveplate and/or a $\lambda/2$ waveplate.

11. The laser system as claimed in claim 1, wherein the laser system further comprises at least one of the following optical components:

a pulse duration setting system for setting the pulse duration of the laser pulses, an optical pulse duration compressor system for compensating for a dispersive contribution of the optical system and for temporally compressing the laser pulses of the pulsed laser radiation that have experienced the nonlinear spectral broadening in at least one of the intermediate focus zones, a beam splitter for separating different polarization states output by the multipass cell, or a control system configured for setting a pressure of the filling gas in the multipass cell so as to compensate for a reduction of the optical nonlinearity of the filling gas for circular polarization.

12. A method for the spectral broadening of pulsed laser radiation, the method comprising:

generating pulsed laser radiation comprising laser pulses having pulse energies in a range of 1 mJ to 100 J and pulse durations in a range of 10 fs to 5 ps, changing a linear polarization state into a circular polarization state of the pulsed laser radiation for passing through a multipass cell, wherein the multipass cell comprises at least two mirrors and is filled with a filling gas having an optical nonlinearity, and wherein a plurality of intermediate focus zones is formed in the multipass cell, input coupling the pulsed laser radiation into the multipass cell, wherein the pulsed laser radiation passes through the plurality of intermediate focus zones and interacts nonlinearly with the filling gas in the intermediate focus zones, thereby causing a spectral broadening of the pulsed laser radiation in the intermediate focus zones, setting the pressure of the filling gas in a pressure range so that there is an ionization behavior of the filling gas in a form of multiphoton ionization, setting focus diameters in the intermediate focus zones so that a peak intensity of the pulsed laser radiation passing through the multipass cell is below an ionization threshold value of the filling gas, wherein the ionization threshold value of the filling gas is increased for circular polarized radiation as compared to linear polarized radiation, output coupling the spectrally broadened pulsed laser radiation out of the multipass cell, and changing the circular polarization state of the spectrally broadened pulsed laser radiation into the linear polarization state.

13. The method as claimed in claim 12, further comprising at least one of:

providing He gas as the filling gas and setting the pressure in a range of 100 Pa to 60 000 Pa, and providing Ar gas as the filling gas and setting the pressure in a range of 100 Pa to 50 000 Pa, or increasing the pressure of the filling gas so as to increase the optical nonlinearity to compensate for a decrease in the optical nonlinearity of the filling gas for circular polarization proceeding from the optical nonlinearity of the filling gas of an identical pressure for linear polarization.

14. The method as claimed in claim 12, wherein the focus diameters of the intermediate focus zones are set so that the peak intensity that arises in conjunction with the pulse durations and the pulse energies of the laser pulses in the intermediate focus zones lies in a range of 60% to 95% of the ionization threshold value.

15. The method as claimed in claim 12, further comprising:

carrying out a dispersion compensation of the spectrally broadened pulsed laser radiation.

16. The method as claimed in claim 12, further comprising setting at least one of the following parameters of the multipass cell:

a dispersion of the laser pulses that has accumulated in the multipass cell, focus diameters of the intermediate focus zones, or Rayleigh lengths of the intermediate focus zones.

* * * * *